United States Patent [19]
Ganoung

[11] Patent Number: 5,030,179
[45] Date of Patent: Jul. 9, 1991

[54] DISCRETE-RATIO TRANSMISSIONS

[76] Inventor: David P. Ganoung, 2800 ½ Candelaria, NW., Albuquerque, N. Mex. 87107

[21] Appl. No.: 466,654

[22] Filed: Jan. 17, 1990

Related U.S. Application Data

[63] Continuation-in-part of Ser. No. 306,800, Feb. 2, 1989, abandoned.

[51] Int. Cl.⁵ .............................................. F16H 3/08
[52] U.S. Cl. ....................................... 475/50; 475/52; 74/333; 74/732.1
[58] Field of Search .............. 74/329, 331, 333, 732.1; 475/36, 49, 50, 53, 52

[56] References Cited
U.S. PATENT DOCUMENTS

2,400,540  5/1946  Chilton .............................. 475/52 X
3,246,542  4/1966  Moan ..................................... 475/50
4,693,129  9/1987  Pierce ..................................... 74/333

Primary Examiner—Dirk Wright

[57] ABSTRACT

A manually-shifted transmission for use in passenger cars and trucks includes a number of constantly-meshed pairs of gears for coupling one shaft to another through a dog clutch on the power output gear of each gear pair. Also included in this basic configuration of the invention are a motorcycle-style shift drum which controls engagement of the dog clutches, a sprag clutch on the power input side of the gear pairs and a wet, multi-disc clutch on the power output side. Since the multi-disc clutch is disengaged for gearshifting, the total gearshift load accelerated or decelerated by the dog clutches is very low and includes none of the gear pairs. The resulting very rapid change from engagement of one gear pair to engagement of another, in conjuction with automatic engagement and disengagement action of the sprag clutch, allows full-power downshifting of the transmission. A variation of this configuration of the invention further includes a fluid coupling which removes the strain of vehicle startup from the multi-disc gearshift clutch, and a different configuration suggestive of twin-countershaft transmissions has full power-shift capability.

30 Claims, 3 Drawing Sheets

DISCRETE-RATIO TRANSMISSIONS

CROSS REFERENCE TO RELATED APPLICATIONS

The present application is a continuation-in-part of my copending application Ser. No. 07/306,800 filed Feb. 2, 1989, and now abandoned and also entitled "Discrete-Ratio Transmissions."

BACKGROUND OF THE INVENTION

1. Field of the Invention

This invention relates to power transmission systems which provide a range of gear ratios in discrete steps.

2. Description of the Prior Art

Manually-shifted transmissions continue to offer a substantial fuel economy advantage in comparison to the production automatic transmissions currently available in passenger cars and trucks. On the other hand, not even the most skillful driver can begin to match the consistent precision with which current automatic transmissions perform downshifts uncompromised by any interruption in engine power output. In fact, the level of skill required for smoothly downshifting a conventional manual transmission often discourages drivers from downshifting in order to elevate engine power output above the range normally used for vehicle cruising. In particular, even experienced drivers have difficulty judging the proper amount by which to elevate engine speed before re-engaging the clutch to complete the downshift. In the case of truck transmissions, added skill is often required because synchronized gearshifting is commonly restricted to transmissions having seven or fewer forward speed ratios. While progress has been made in automating the gearshifting sequence of manual truck transmissions, these transmissions are expensive and unproven in the domestic market.

SUMMARY OF THE INVENTION

In view of the above, it is therefore an object of the invention to provide manually-shifted transmissions which transfer power efficiently and at the same time readily accommodate downshifting without interruption in full-throttle operation of an associated combustion engine.

It is also an object of the invention to present automotive and heavy-duty automotive transmissions with enhanced manual operation.

It is yet another object of the invention to provide a heavy-duty automotive transmission which extends the convenience of synchronized gearshifting to transmissions which incorporate a large number of unevenly-spaced forward speed ratios.

It is still another object of the invention to present transmission configurations which facilitate more efficient operation of motor vehicles.

These and other objects, features and advantages will become apparent to those skilled in the art from the following detailed description when read in conjunction with the appended claims and the accompanying drawing.

In accordance with the invention in its broad aspect, a discrete-ratio transmission is presented. The transmission includes a multi-speed gear system which follows conventional practice by incorporating a dog clutch or synchronizer preferably on the power output side of one pair of gears for each of several forward speed ratios. A high-torque clutch device on the power output side of the multi-speed gear system allows gearshifting from one speed ratio to another with minimal inertial loading of the dog clutches or synchronizers. As a result, the operating speeds of idling gears are held to low values while at the same time both a large number of forward speed ratios and full-power downshifting are practical. Notable features of some different variations of the invention include a fluid coupling or torque converter for initiating motion of the associated vehicle, a sprag clutch on the power input side of the multi-speed gear system, and an automatic control system for utilizing the sprag clutch to execute power-on downshifts.

BRIEF DESCRIPTION OF THE DRAWING

The present invention is illustrated in the accompanying drawing, in which.

In the figures of the drawing, like reference numerals denote like parts.

DESCRIPTION OF THE PREFERRED EMBODIMENTS

Figure 1:
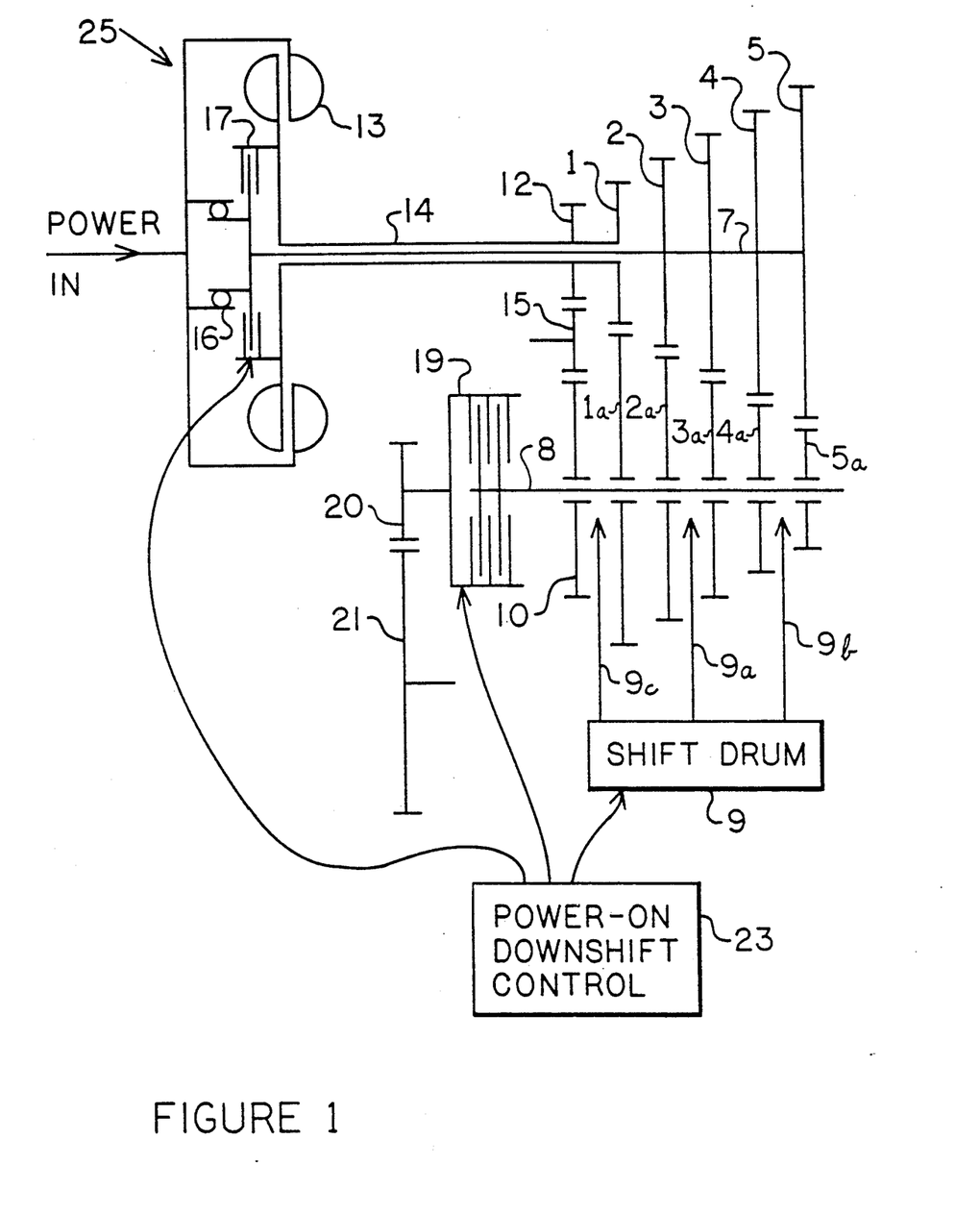
FIG. 1 is a schematic diagram of major components in a front-wheel-drive passenger car transmission according to a preferred embodiment of the present invention.

FIG. 1 in the accompanying drawing shows how one preferred embodiment of the present invention would dictate the arrangement of major components in a discrete-ratio transmission for front-wheel-drive passenger cars. This transmission incorporates several features of established design practice, most notably, by employing a separate pair of constantly meshed helical gears for each of the five example forward speed ratios shown. In particular, teeth on gear 1 always engage teeth on the mating gear 1a to thereby make available the greatest forward-speed torque multiplication ratio for the transmission of FIG. 1, or what is more commonly referred to as the first gear ratio of the transmission. Similarly, gear 2 passes positive engine power output to gear 2a when second gear is active, and so on through constantly-meshed gears 5 and 5a for fifth gear of the transmission.

Still within the realm of established practice are the permanent connection of each of the power input gears 2 through 5 to the gear-cluster shaft 7 and the disengageable connection of each of the mating power output gears 2a through 5a to the clutch shaft 8. Nevertheless, the method of sequentially coupling one at a time of the gears 2a through 5a to the clutch shaft 8 originates in the practice established for motorcycle transmissions rather than for passenger car transmissions. More specifically, the shift drum 9 utilizes a shift fork 9a to position a dog clutch collar (not separately shown) splined to the clutch shaft 8 between gears 2a and 3a and another shift fork 9b to position a second dog clutch collar splined to shaft 8 between gears 4a and 5a. Other than the dog clutch collars each being a completely separate component, as opposed to being integral with a gear, this method of sequential gear selection is extremely well known to those familiar with motorcycle transmissions. Consequently, the requisite gear selection apparatus associated with shift drum 9 is shown symbolically in FIG. 1, with each dog clutch being represented in its disengaged state by a freewheeling bearing integral with the appropriate one of the gears 10 and 1a through 5a.

The remaining shift fork 9c selects either first gear or reverse gear for initiating motion of the associated passenger car. This selection is made by locking either gear 1a or reverse power output gear 10 to the clutch shaft 8 via a third dog clutch collar, which is not separately shown. Both of the corresponding power input gears 1 and 12 are continuously driven by the fluid coupling 13 through the auxiliary shaft 14, which is coaxial with the gear-cluster shaft 7. In reverse gear, engine power output travels from the input gear 12 to the reverse idler gear 15 and then to the power output gear 10 for reverse. The fluid coupling 13 is normally driven directly by the associated engine.

Unlike the auxiliary shaft 14 used for first and reverse gear, the gear-cluster shaft 7 receives engine power transferred without any slippage. Stated differently, the cluster gears 2 through 5 receive engine power output through a parallel powerpath which includes a one-way sprag clutch 16 instead of the fluid coupling 13. Since the one-way clutch 16 will only transfer positive torque output from the associated engine to the gear-cluster shaft 7, the engine braking clutch 17 is included to engage the gear-cluster shaft to the power output side of the fluid coupling 13 when necessary.

On the power output side of the entire transmission, a wet multi-disc clutch 19 joins the clutch shaft 8 directly to gear 20, which drives the overall power output gear 21. Gear 21 attaches to the differential carrier assembly in the drive axle of the associated passenger car, but the carrier assembly is not shown. Finally, the power-on downshift control system 23 has actuator outputs for controlling the shift drum 9, the engine braking clutch 17 and the gearshift clutch 19.

In operation with the associated engine at idle speed, the driver of the associated passenger car can keep the car stopped with the gearshift clutch 19 either engaged or disengaged, provided that the transmission is in first gear, reverse gear or neutral. To prepare for forward acceleration, the driver engages the clutch 19 with gear 1a being locked to clutch shaft 8 for first gear as can be conveniently indicated by a single-digit dashboard display. Since the fluid coupling 13 provides refined automatic engagement action for initiating vehicle motion, the driver need only advance the engine throttle to accelerate from rest.

When it is time for the first upshift, the driver follows a basically conventional procedure by manually disengaging the gearshift clutch 19, next upshifting to second gear via a manual command to the shift drum 9 and then re-engaging the clutch 19. This first upshift causes the shift drum 9 to uncouple the clutch shaft 8 from gear 1a while the gearshift clutch 19 is disengaged. In this state, the clutch shaft 8 is free to undergo extremely rapid acceleration because it is isolated from all other major components, especially the gear pairs 1 and 1a through 5 and 5a, and even from the reverse gears 10, 12 and 15. As a result, the ensuing engagement of shaft 8 to gear 2a via the associated dog clutch and shift fork 9a does cause extremely rapid acceleration of shaft 8. Nevertheless, the accompanying inertial loading of the associated dog clutch has a smaller relative magnitude than in motorcycle transmissions because not even a single gear pair is coupled to shaft 8 during its rapid accelerations and decelerations caused by gearshifting. In addition, confining the thermal load of vehicle startup to the fluid coupling 13 contributes to design of the gearshift clutch 19 for minimizing rotational inertia associated with the clutch shaft 8.

Also notable for the first upshift is the change in powerpath from one that includes the fluid coupling 13 to one that includes the one-way clutch 16. The fact that only the first and reverse input gears 1 and 12 receive power transferred through the fluid coupling 13 means that the hydrodynamic losses of the coupling 13 are inherently eliminated immediately upon upshifting to second gear. Not only is the expense associated with a lockup clutch for the fluid coupling 13 thereby avoided, but the equivalent lockup schedule is very aggressive for good fuel economy and acceleration. Since hydrodynamic losses are therefore restricted to first gear during forward operation, a relatively narrow gear ratio gap between first gear and second gear will keep hydrodynamic energy loss on the order of the friction energy loss in a manual clutch by encouraging the driver to upshift out of first gear early. In any case, slippage in the coupling 13 will cause the drop in engine speed accompanying the first upshift to be somewhat greater than expected purely on the basis of ratio gap. A narrow ratio gap between first and second gear becomes especially beneficial when a torque converter is used in place of the fluid coupling 13 to compensate for the poor low speed torque characteristics typical of passenger car engines tuned for high specific power output.

Upshifts subsequent to the first one require the driver to perform the same sequence of manual operations and cause the clutch shaft 8 to again undergo rapid acceleration upon dog clutch engagement. In contrast to this repetition of events, the engine braking clutch 17 must be disengaged during operation in first and reverse gear, but engaged for operation in second through fifth. The requisite automatic control of the braking clutch 17 is best included as an auxiliary function of the power-on downshift control system 23 because the control system 23 regulates the clutch 17 during power-on downshifting. Even so, the alternative placement of the braking clutch 17 directly in parallel with the one-way clutch 16 allows the clutch 17 to remain engaged at all times other than during power-on downshifting. Placement of clutch 17 as shown in FIG. 1 utilizes the fluid coupling 13 to transfer engine braking torque, thereby helping smooth rapid transitions between positive and negative engine power output.

Although downshifting causes the rapid speed change of the clutch shaft 8 to be a deceleration rather than an acceleration, the foregoing discussion of upshifting still adequately elucidates the process of manually downshifting the transmission of FIG. 1. Nonetheless, motorcyclists will point to the difficulty encountered in downshifting a motorcycle transmission when vehicle speed is at or near zero. So while motorcyclists are accustomed to downshifting in sequence before coming to a stop, passenger car drivers are not. The transmission of FIG. 1 does employ a dog clutch type of shift apparatus basically as used in motorcycles, but the gearshift clutch 19 resides on the power output side of the assemblage of gear pairs which offers a choice of forward speed ratios. The resulting continuous gear rotation ensures easy downshifting even when the overall power output gear 21 is not rotating.

Even though the vehicle operator does follow basically conventional procedures in manually shifting the transmission of FIG. 1, these procedures are enhanced in comparison to conventional manual transmissions. Since relatively low force and energy levels suffice for changing the gear ratio in a dog clutch system, simple and modestly sized electric solenoid type actuators (not shown) may be used for rotational indexing of the shift drum 9: Solenoid actuated shifting would combine with the sequential gearshifting inherent using the shift drum 9 to allow, as just one example, changing gear ratios in the upshift direction at the touch of one button, and in the downshift direction at the touch of another button. The driver would not be bothered with a gearshift pattern, even with several speed ratios added for use in trucks, and gearchanging would be further enhanced by the much faster engagement action of dog clutches in comparison to synchronizers.

The nature of the gearshift clutch 19 also contributes to greatly enhanced manual gearshifting, mainly because the clutch 19 follows the practice established for the wet, multi-disc clutches used in the automatic transmissions of passenger cars and trucks. That is, actuation of the clutch 19 using hydraulic pump pressure permits the diver's clutch pedal (or other clutch control device) to have a travel that can be just as short and light as desired. The same hydraulic valve (not separately shown) thus under manual control for manual gearshifting would additionally be under the automatic control of the system 23 during the power-on downshift sequence of events that will be considered next.

The range of power-on downshifts for the transmission of FIG. 1 will not include downshifts into first gear unless the engine braking clutch 17 assumes an alternative placement directly in parallel with the one-way clutch 16. If so, the parallel combination of the two clutches 16 and 17 must be positioned between the fluid coupling 13 and the associated engine so that both of the shafts 7 and 14 will receive engine power as transferred through the one-way clutch 16. Shaft 7 would still be coupled to the associated engine directly through the one-way clutch 16, but shaft 14 would be coupled to the engine through the one-way clutch 16 and the fluid coupling 13 in series. In any case, manual downshifts into first gear are always possible with the enhanced gearshifting features already explained, and a relatively narrow ratio gap between first and second gear reduces the need for downshifting into first gear once under way.

The control system 23 for automatically executing power-on downshifts includes suitable actuators and sensors (not shown separately) for performing the sequence of events which begins with simultaneous and rapid disengagement of the gearshift clutch 19 and the engine braking clutch 17. This beginning step precipitates a free acceleration of the associated engine, but the control system 23 indexes the shift drum 9 to secure the desired gearchange just as soon as full disengagement of the clutches 17 and 19 is detected. As a result of the quick gearchanging action of the dog clutches integral with the gears 1a through 5a, complete indexing of the shift drum 9 will be detected well before the associated engine can accelerate, even at wide open throttle, to the crankshaft speed required by completion of the downshift sequence. Immediately upon such detection, the control system 23 re-engages the gearshift clutch 19 quickly enough that the gear-cluster shaft 7 will overspeed the freely accelerating engine. The one-way clutch 16 accommodates this overspeed condition because the control system 23 keeps the engine braking clutch 17 disengaged until the associated engine reaches synchronous speed as indicated by equality of shaft speed across the one-way clutch 16. In this manner, a single one-way clutch 16 serves to precisely terminate free acceleration of the engine for all of the gear-ratio-to-gear-ratio combinations that are amenable to power-on downshifting, including out-of-sequence downshifts. In addition, the foregoing power-on downshift sequence changes the angular position of the cluster gears 2 through 5 relative to that of the crankshaft of the associated engine. Such positional indexing becomes essential for even wear around the teeth of gears 2 through 5 when the engine braking clutch 17 has its alternative location that does not pass engine braking torque through the fluid coupling 13. Also noteworthy is the fact that the engine braking clutch 17 engages only under synchronous conditions and carries much less than maximum engine torque. Clutch 17 is a friction clutch merely to allow engagement in any angular position.

The above power-on downshift sequence depends on fast activation of the clutches 17 and 19 as well as on the very rapid gearchanging action inherent with dog clutches. Therefore, a hydraulic accumulator (not shown) will reduce the pump flow rate necessary for sufficiently fast clutch actuation. That the extra fast gearchanging action of dog clutches contributes to the viability of power-on downshifting is not to say that an arrangement using synchronizers in their place would be impractical. Dog clutches are preferred for coupling the gears 1a through 5a to shaft 8 in no small part because they improve on synchronizers with respect to compactness, durability and especially mass production cost.

With the arrangement and operation of components in the embodiment of FIG. 1 now in mind, several comparisons can be drawn with conventional transmissions. First, the transmission of FIG. 1 would retain significant advantages in durability and in enhanced manual gearshifting even if the transmission were to be simplified by eliminating the control system 23 and by replacing the sprag clutch 16 with a direct connection of the gear-cluster shaft 7 to the crankshaft of the associated engine. Without these components, power-on downshifting would obviously be sacrificed.

The comparative value of power-on downshifting is introduced by realizing that upshifts often occur when a rather moderate level of engine power output can be produced more economically at a lower engine speed. The accompanying reserve of power that is immediately available allows the driver to compensate for the interruptions in power output necessitated by manual gearshifting. In contrast, downshifting is often needed in response to the driver's demand for suddenly increased power output or for an increase in an already comparatively high level of power output. The sprag clutch 16 entails a very modest cost for eliminating these much more objectionable interruptions in power output. Similarly, the control system 23 entails only modest cost because it performs only a few steps that are in simple sequence.

So with one notable exception, powershift capability returns a much greater benefit when applied to downshifting than when applied to upshifting, especially if manual upshifting is already sophisticated in its execution. Moreover, upshifting is much easier than downshifting for the driver to perform if simple downshifting during a deceleration or at a stop is excepted. As a result, the present invention can be viewed as using simple apparatus to automate the gearshifting procedures that are most difficult for the driver to perform properly, but at the same time the invention also refrains from incorporating relatively complex apparatus that would automate procedures easy and even enjoyable for the driver to carry out. Nevertheless, the present invention does encompass variations with full power-shift capability, as will be explained with reference to FIG. 3.

The exception just referred to is that automatic upshifting can be very desirable during maximum vehicle acceleration. If automatic upshifting is in fact restricted to maximum vehicle acceleration, then the following simple strategy will be adequate for the embodiment of FIG. 1. Since the dog clutches managed by the shift drum 9 do secure extremely rapid gearchanging action, only a very brief interruption in power output would prevent the associated engine from experiencing a free acceleration when the gearshift clutch 19 is automatically disengaged for full-power upshifting. As one way of obtaining the necessary brief interruption in power output, the intake-port fuel injection system of a gasoline engine can be disabled for an instant which includes full upshift indexing of the shift drum 9 and which also extends partly into the subsequent automatic re-engagement of the gearshift clutch 19 at a controlled rate. Restriction of this strategy to all-out acceleration of the associated vehicle simplifies calibration for the controlled re-engagement of clutch 19 and reduces driver expectation that the gearshifts be smooth.

In comparison strictly to conventional manual transmissions, the automatic power-on downshifting and enhanced manual upshifting of the present invention clearly encourage an increase in the average frequency at which gearshifts are performed. For example, to smoothly downshift a conventional manual transmission from overdrive to fourth gear in order to maintain vehicle speed while climbing a hill requires the driver to increase engine speed the right amount before re-engaging the clutch to complete the downshift. The difficulty of doing this well causes many drivers to avoid shifting into overdrive in the first place unless it appears that overdrive can be used without interruption for at least several miles. In contrast, the present invention would encourage the driver to conserve fuel by shifting into overdrive more frequently. For the same basic reasons, extending the overall transmission ratio range and reducing the gear ratio gaps both become much more viable through the use of a greater number of forward speed ratios. And both further contribute to improved fuel economy.

In addition, many drivers of cars with manual transmissions often depend purely on wide open throttle operation, without the benefit of a downshift, to gain extra power for hillclimbing or for maneuvering in traffic. For these drivers, the power-on downshifting feature of the present invention would therefore allow equal performance from a smaller, more economical engine. In a similar way, the more modest torque output of high specific output engines would become more acceptable (especially so using a torque converter in place of the fluid coupling 13), thus helping realize the full fuel economy potential of engine features such as variable valve timing and four-valve combustion chambers.

Now reorienting the comparison with conventional transmissions from purely operational features to features more directly related to the apparatus itself, we find that the particular embodiment of FIG. 1 in effect places highest priority on isolation of the clutch shaft 8 from encountering any unnecessary rotational inertia during gearshifting. The direction of positive engine power flow from the gear-cluster shaft 7 to the clutch shaft 8 immediately confirms that the disengageable coupling of each of the gears 1a through 5a is on the power output side of the multi-speed gear system comprised of shaft 7, shaft 8, gears 2 through 5 and mating gears 2a through 5a. This is not at all unusual in itself because many conventional transmissions for use in rear wheel drive vehicles locate the disengageable coupling on the power output side in each of the forward speed ratios. However, these conventional transmissions locate the clutch used for gearshifting on the power input side, where it tends to maximize rather than minimize gearshift loading of synchronizer assemblies. In other words, downshifting in this conventional type of transmission requires the active synchronizer to overcome the inertia and gear mesh friction of every forward-speed gear pair in order to accelerate all of those gear pairs to the higher operating speed required by the downshift. (A similar acceleration of all of the gear pairs does occur in the transmission of FIG. 1 during the power-on downshift sequence already explained, but the gearshift clutch 19 is obviously much more robust than the friction clutch element of a synchronizer, and it thus accomplishes this task easily.) It is no wonder then that synchronized truck transmissions are commonly limited to about seven forward speed ratios. Additional forward speed ratios may, in contrast, be added to the configuration of FIG. 1 without encountering any such limitation. In this sense, the present invention offers greater advantages when applied to trucks than when applied to passenger cars.

Another priority implicit in the hardware configuration of FIG. 1 is to limit the operational speeds of gears that, from the standpoint of not currently being used to carry engine power, may be described as idling. As the best example of limiting the speed of idling gears, operation in first gear will cause gear 1 to reach maximum engine speed at a relatively low vehicle speed, most especially if a very low first gear ratio is employed in the manner typical of truck transmissions. If the pair of gears 1 and 1a were to be disengageably coupled at gear 1 rather than at gear 1a, then the speed of gear 1 would continue to increase with vehicle speed as vehicle speed passed its maximum value for operation in first gear. Since vehicle cruising speeds for trucks can easily exceed the maximum first gear speed by a factor of at least two or three, gear 1 would in this example continuously exceed maximum engine speed by a large factor during vehicle cruising. The hardware configuration of FIG. 1 avoids such grossly exaggerated speeds of idling gears.

Nevertheless, the transmission of FIG. 1 does not have the configuration which obtains the absolute lowest speeds for idling gears. Most notably, the fifth gear pair 5 and 5a would function as an overdrive ratio by matching the engine speed of maximum power output to a vehicle speed well above its normal maximum, and consequently the idling speed of gears 5 and 5a could be reduced by relocating the disengageable coupling from gear 5a to gear 5. In the embodiment of FIG. 1, holding the rotational inertia of clutch shaft 8 during gearshifting to the lowest practical level readily takes precedence over reducing the idling speed of gears 5 and 5a from an already very acceptable level.

Although the preferred embodiment of FIG. 1 uses simple dog clutches in preference to synchronizer assemblies, it is interesting to note the intrinsic conflict between using synchronizers and locating the clutch used for gearshifting on the power input side of the multi-speed gear system. The lowest synchronized gear ratio best illustrates this conflict because keeping the idling speed of the associated gear pair within reason requires that the synchronizer be on the power output gear of the gear pair. The high torque multiplication ratio of this gear pair then becomes, from the standpoint of the synchronizer, a torque reduction ratio which greatly reduces torque applied by the synchronizer; this fact has special significance for wide-ratio truck transmissions. Only relocation of the gearshift clutch to the power output side of the multi-speed gear system will resolve the original conflict.

All of the advantages that have been explained for the transmission of FIG. 1 necessitate only one compromise of any significance, namely that the gearshift clutch 19 must carry torque loading which is multiplied by nearly the overall transmission ratio range. To mitigate this compromise, the fluid coupling 13 relieves the gearshift clutch 19 of all design requirements for dissipating the comparatively large amounts of heat liberated when the associated passenger car is started from rest, including those occasions when the car is fully loaded and heading uphill. The smooth, progressive engagement action inherent in the coupling 13 also relieves the gearshift clutch 19 of any need for truly refined engagement action because smooth manual gearshifting depends primarily on proper timing of rather abrupt re-engagement of the clutch 19. These facts do not prohibit simplifying the transmission of FIG. 1 by eliminating the fluid coupling 13 and designing the clutch 19 for the rigors of vehicle startup. Since the auxiliary shaft 14 would be eliminated in this simplified variation, along with the coupling 13, the gears 1 and 12 would be moved to the gear-cluster shaft 7.

Several factors justify the inclusion of the fluid coupling 13 in preference to the basically simpler approach of designing the gearshift clutch 19 for vehicle startup as well as for gearshifting. Most importantly, the clutch devices 13 and 19 complement each other in the obvious sense that the coupling 13 provides extremely refined, automatic engagement action, but it cannot be disengaged for gearshifting. The gearshift clutch 19 prevents this from being a shortcoming in any way. Similarly, the clutch 19 can easily handle the requisite high torque loads while adding minimum inertia to the clutch shaft 8 so long as the fluid coupling 13 is available to initiate vehicle motion. That this last fact is true even for adaptation of the present invention to large trucks is evident from the multi-disc clutches currently used in the Allison HT740 truck transmission. When the associated maximum torque converter stall ratio is taken into account, the compact forward clutch in the HT740 transmission is found to be capable of transmitting nearly 4000 pound-feet of torque. As the last of these factors which help justify inclusion of the fluid coupling 13, the pump which supplies actuation pressure to the gearshift clutch 19 can also serve as a transmission lubrication pump and as a fill & circulation pump for the fluid coupling 13. (Hydraulic pressure would also actuate the engine braking clutch 17.) In summary then of the preferred embodiment of FIG. 1, the utilization of dog clutches in place of synchronizer assemblies counteracts the added manufacturing cost entailed by separating the clutching functions of vehicle startup and gearshifting and entailed by including simple power-on downshifting components.

Figure 2:
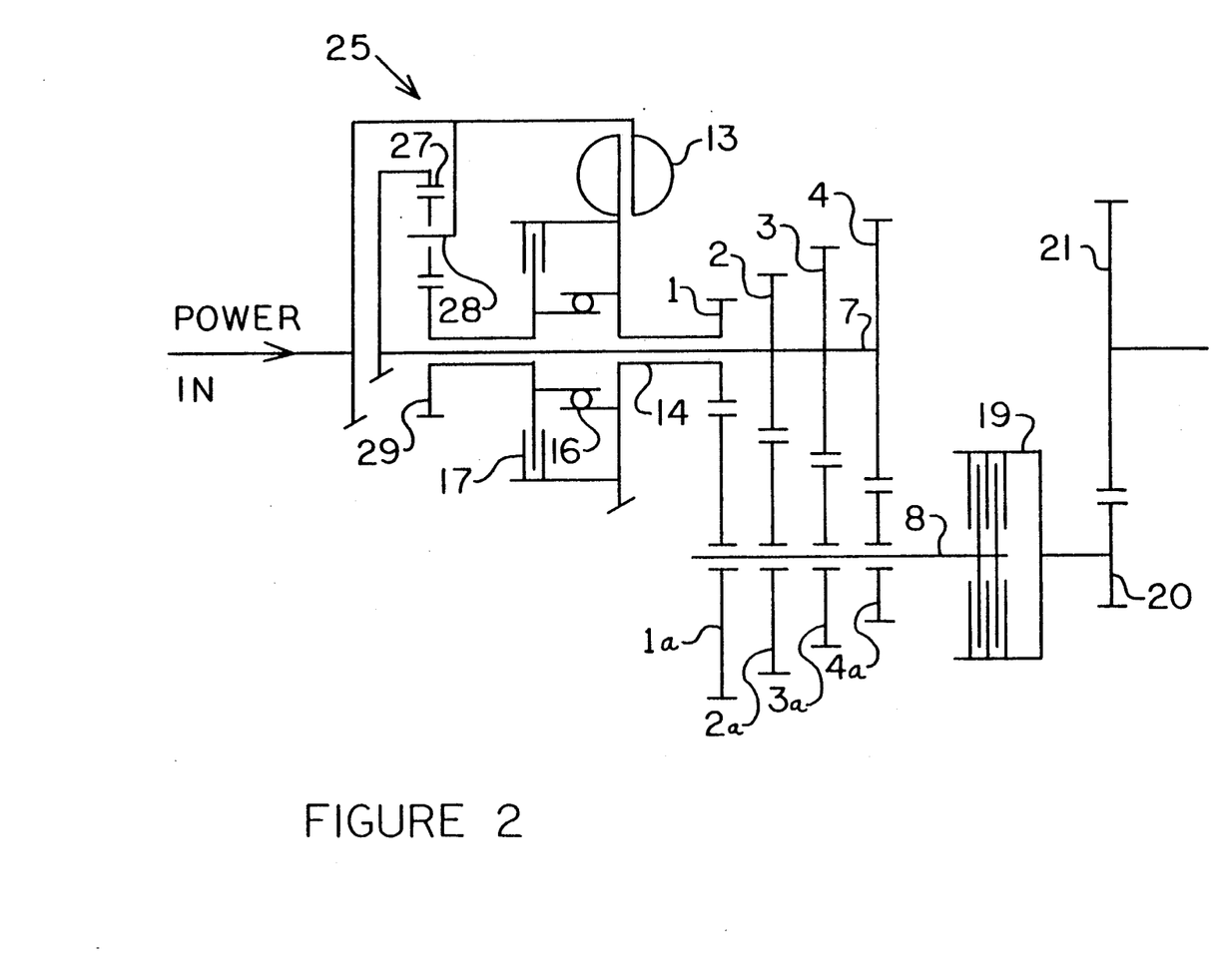
FIG. 2 is a schematic diagram showing modifications to the embodiment of FIG. 1.

A few relatively minor variations of the embodiment of FIG. 1 have already been noted, and FIG. 2 shows more extensive modifications which are especially appropriate for the heavy-duty automotive applications exemplified by large trucks. In FIG. 2, the coupling assembly 25 contains a planetary gearset as well as the fluid coupling 13, sprag clutch 16 and engine braking clutch 17. As before, the fluid coupling 13 transfers all of engine power output via shaft 14 to the power input gear 1 for operation in first gear. The portion of the powerpath extending from the associated engine to the clutch shaft 8 likewise remains unchanged for operation in reverse gear, but FIG. 2 focuses on modifications of the embodiment of FIG. 1 and thus shows only four example forward speed ratios. For this same reason, the shift drum 9 and the power-on downshift control system 23 are not repeated in FIG. 2 in spite of the fact that they are to be included in the transmission represented in FIG. 2.

With the exception that the engine braking clutch 17 can remain engaged during operation in first gear and in reverse gear, the embodiment of FIG. 2 does duplicate the basic first and reverse gear operation already explained with reference to FIG. 1. Upon upshifting to second gear, however, the gear-cluster shaft 7 will receive a minor fraction of engine power transferred hydrodynamically through the fluid coupling 13. More specifically, this minor fraction of power results from the connection of the gear-cluster shaft 7 directly to the ring gear 27 in combination with both the permanent attachment of the associated planet carrier assembly 28 to the pump section of the fluid coupling 13 and the disengageable coupling of the sun gear 29 to the runner section of the coupling 13 through clutches 16 and 17 in parallel. Completing the modifications to the embodiment of FIG. 1 as indicated in FIG. 2 are the relocation of the gearshift clutch 19 to the righthand side of the clutch shaft 8 and the relocation of the final drive gears 20 and 21 with the axis of rotation for gear 21 being on an extension of that for the crankshaft of the associated engine. Since the transmission represented in FIG. 2 does not have a straight-through gear ratio, the rotational axis of output gear 21 can be offset from the engine crankshaft axis if desired.

The sequence of events for power-on downshifting is identical for the transmissions of FIGS. 1 and 2 from the standpoint that the gearshift clutch 19 very briefly cycles into disengagement to thereby accommodate the actual gearchange via rotational indexing of the shift drum 9, with disengagement of the engine braking clutch 17 extending until slightly after that time when the sprag clutch 16 locks. During the brief time interval when the shaft 7 and attached ring gear 27 overspeed the engine crankshaft and attached planet carrier 28, the sun gear 29 will drop below crankshaft speed, possibly even turning in the reverse direction. Concurrently with this change from overspeed to underspeed relative to the engine crankshaft, the planetary gearset in the assembly 25 also causes a reduction in the torque loading across the clutches 16 and 17, which is a significant benefit in the case of large Diesel truck engines capable of developing over 1400 pound-feet of torque. For instance, if the ring gear 27 has three times as many teeth as the sun gear 29, then the sprag clutch 16 will carry only one-third of engine output torque, and the auxiliary clutch 17 will carry only one-third of engine braking torque.

Reduction of torque loading across the sprag clutch 16 originates in the effect of the planet carrier 28 to split torque into a major fraction received by the ring gear 27 and a minor fraction received by the sun gear 29. The major fraction accounts for all power transferred through the transmission of FIG. 2 because the minor torque fraction recirculates back to the planet carrier 28 through a powerpath which includes the sun gear 29, sprag clutch 16 and the fluid coupling 13. Recirculation of power does increase torque loading of the clutch 16 somewhat in comparison to one alternative planetary arrangement as suggested by FIG. 3, but at the same time there are offsetting advantages. One offsetting advantage is that the sun gear 29 underspeeds rather than overspeeds the engine crankshaft by an amount that is exaggerated by the planetary gearset. Another interesting advantage concerns the reversal that results in the direction of powerflow through the fluid coupling 13 upon upshifting to second gear. If the fluid coupling 13 is replaced with a torque converter, then this reversed powerflow will ensure that the torque converter will actually function as a fluid coupling in all but first and reverse gear.

It is also interesting to note that the planetary gearset within the assembly 25 will guarantee even wear around the teeth of gears 2, 3 and 4 even if the clutches 16 and 17 are replaced by a permanent connection of the sun gear 29 to the section of fluid coupling 13 which acts as its runner during operation in first gear. Stated in alternative words, slippage in the coupling 13 will generate nearly constant indexing of the angular position of the gear-cluster shaft 7 relative to the angular position of the engine crankshaft. The indexing in turn avoids having the engine's power pulses always concentrated on the very same gear teeth. This feature would have extra significance if, with reference now to FIG. 1, the power-on downshift control system 23 were to employ such sophisticated control of the gearshift clutch 19 that the sprag clutch 16 could be eliminated. In particular, free acceleration of the associated engine would be terminated during a power-on downshift by extremely precise re-engagement of the gearshift clutch 19, thereby making the clutches 16 and 17 unnecessary. Inclusion of the clutches 16 and 17 is preferred because the sprag clutch 16 inherently provides very precisely timed re-engagement with high levels of reliability and durability.

As already noted, the fluid coupling 13 will transfer only a minor fraction of engine torque after upshifting the transmission of FIG. 2 to second gear. If the ring gear 27 has three times as many teeth as the sun gear 29, then this minor fraction will be 33%. The corresponding reduction in hydrodynamic power loss through the coupling 13 will nevertheless greatly exceed 67% because slippage is amplified by a factor of three at the same time that torque is reduced by 67%. For example, an overall slippage of 2% measured between the associated engine and the gear cluster-shaft 7 translates into 6% slippage across the fluid coupling 13 itself. So the question for an overall hydrodynamic power loss of 2% is not whether 33% of engine torque can be transferred through the coupling 13 at 2% slippage, but whether the 33% of engine torque can be transferred at 6% slippage of the coupling 13. In fact, the latter question is still too conservative because another effect of the planetary gearset in the assembly 25 is to manifest slippage in elevated speed of the runner section (now acting as the pump) of the coupling 13, rather than decreased speed of the pump section. The minor fraction of torque transmission that remains through the coupling 13 after the first upshift helps smooth slow-speed, high-torque engine operation as well as the automatic engagement of the sprag clutch 16 and abrupt transitions between positive and negative engine power output.

When the planetary gearset of assembly 25 in FIG. 2 is transferring engine power, its gear meshing speeds have values which are extremely moderate because gear mesh action while under load arises purely from slippage in the fluid coupling 13. Slippage can of course reach 100% when the transmission is in first gear, but the planetary gearset is not transmitting power at that time. Moreover, slippage in the coupling 13 is greatly limited by the split-powerpath effect already explained. Gear meshing speeds do reach normal values in the planetary gearset of assembly 25, but only very briefly during power-on downshifts when the gearset is not under load. Consequently, the planetary gearset in the assembly 25 can utilize many cost saving design features without exceeding acceptable noise limits and without compromising acceptable durability of the gearset.

Just as the planetary gearset in assembly 25 reduces torque loading across the fluid coupling 13, so too can planetary gearing be used to reduce torque loading across a friction clutch like the gearshift clutch 19. (When the sole purpose of planetary gearing is to reduce clutch torque loading, an arrangement having the basic configuration shown in FIG. 3 would be preferable to the configuration of FIG. 2.) Even so, reduction of torque loading across the gearshift clutch 19 in FIG. 2 is not really necessary because, as already noted, a torque capacity of 4000 pound-feet is already within the capability of compact multi-disc clutches of the type now being employed in automatic transmissions for trucks.

Reduced clutch torque loading does become more desirable in the case where the embodiment of FIG. 2 is modified to duplicate the manual transmission configuration long predominant in production rear-wheel-drive cars and trucks. More specifically, the gears 20 and 21 function as master speed reduction gearing because they multiply torque during operation in each and every gear ratio of the transmission of FIG. 2. In contrast to the situation in conventional rear-wheel-drive transmissions, the master reduction gears 20 and 21 obviously do not reside on the power input side of the multi-speed gear system comprised of shaft 7, shaft 8, gears 2 through 4 and gears 2a through 4a. If they did, the gearshift clutch 19 would be left on the extreme power output side of the transmission where its maximum torque loading would exceed that of the configuration of FIG. 2 by a factor of three or four. A simple, low-cost planetary gearset added to the clutch 19 could entirely offset this torque factor and also offset its own cost by allowing the straight-through one-to-one transmission ratio achieved with the conventional transmission configuration. Another advantage of the conventional configuration is adaptability to twin and triple countershaft designs, but the configuration of FIG. 2 is preferred mainly because of its greater compatibility with the arrangement for alternate powerpaths through shafts 7 and 14.

Figure 3:
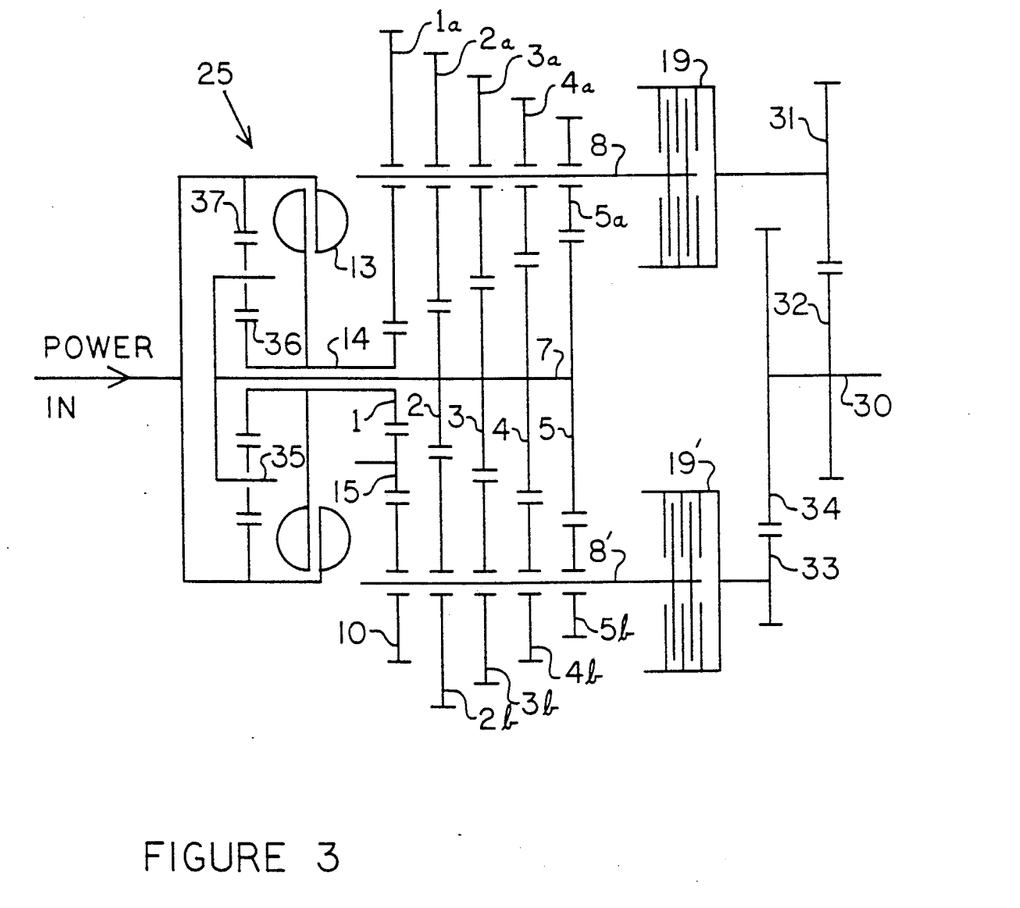
FIG. 3 is a schematic diagram of major components in a full powershift transmission according to the present invention.

Turning now to FIG. 3, a variation of the present invention for full powershift operation is represented. In this variation, the gear-cluster shaft 7 and the auxiliary shaft 14 still combine to provide the choice of a completely hydrodynamic powerpath for operation in first and reverse gear, as well as an alternate, more efficient powerpath for operation in all of the remaining speed ratios. Nevertheless, each of the gears 2 through 5 on the gear-cluster shaft 7 now continuously meshes with not one, but two gears. For example, the gear 2 meshes with gear 2a supported on the first clutch shaft 8 and also meshes with identical gear 2b supported on the second clutch shaft 8 prime. Although the operating speeds of gears 2a and 2b are therefore always the same, the corresponding overall transmission gear ratios measured at the transmission output shaft 30 depend on whether gear 2a is coupled to transmit engine power via the first gearshift clutch 19 or gear 2b is coupled to transfer power via the second gearshift clutch 19 prime. Which is to say that the speed ratio between the power output side of clutch 19 and the output shaft 30 differs from the ratio between clutch 19 prime and shaft 30. The gears 31 and 32 couple the clutch 19 to shaft 30, and gears 33 and 34 couple the other clutch 19 prime to shaft 30.

In operation, a single shift drum (not shown) manages the selective engagement of one of the gears 10 and 2b through 5b to shaft 8 prime as well as the selective engagement to shaft 8 of one of the gears 1a through 5a. As before, selective engagement is through dog clutches depicted simply as a freewheeling bearing integral with the power output gear in each of the available forward and reverse speed ratios. If gear 1a is locked to shaft 8 with the gearshift clutch 19 engaged, then the assembly 25 will direct all of engine power through the fluid coupling 13 on its way to gear 1a. Furthermore, if gear 2b is at the same time locked to the other clutch shaft 8 prime, then a power-on upshift to second gear is available by properly coordinating the release of clutch 19 with the engagement of clutch 19 prime. This upshift to second gear of course causes most of engine power to bypass the fluid coupling 13 because only 25% of the torque received by the planet carrier 35 comes from the sun gear 36 via the fluid coupling 13 if the ring gear 37 has three times the number of teeth on the sun gear 36.

After the upshift to second gear, the continuing disengaged state of gearshift clutch 19 allows gear 2a to be locked to shaft 8 in place of gear 1a in preparation for the upshift to third gear. Upshifting in sequence thus proceeds with engine power flowing first through one and then the other of the two multi-speed gear systems which are based on selective gear engagement to shafts 8 and 8 prime. Sequential downshifting is similarly achieved by properly coordinating engagement of one of the gearshift clutches 19 and 19 prime with release of the other of these clutches after making the appropriate gearchange on shaft 8 or 8 prime, but power-on downshifting does not employ the overlapping partial engagement of clutches 19 and 19 prime to the extent used during upshifting; appropriate clutch control is exemplified by the "all-adaptive" electronic control now used in a domestically-produced 4-speed automatic transmission for passenger cars as outlined in SAE paper number 890529. In addition, hydraulic engagement pressure in the gearshift clutches 19 and 19 prime should change to account for torque variations caused by the choice of different gear ratios as well as by the operating status of the associated engine. Which is to say that "modulator" pressure (also known as throttle valve pressure) should be based on the angular position of the associated shift drum as well as on engine throttle valve position.

When the powerflow through the transmission of FIG. 3 changes from, for instance, gear 2a to gear 3a, the powerpath first transfers to gear 3b on the other clutch shaft 8 prime. Therefore the transition from gear 2a to gear 3a encompasses a double ratio gap which is split by the intervening transfer to gear 3b on clutch shaft 8 prime. Accordingly, the in-sequence ratio gap for all upshifts except the first one should be the same, and therefore the same double ratio gap will separate each of the gear pairs corresponding to gears 2a through 5a and gears 2b through 5b. The ratio of gears 31 and 32 relative to that of gears 33 and 34 establishes the value of the single ratio gap. Although the transmission represented in FIG. 3 has nine forward and one reverse speed ratios, more forward or reverse ratios can easily be added, or the ratio gap can be varied by having one or more of the gears on shaft 7 mesh with only one gear on shaft 8 or shaft 8 prime.

Although FIG. 3 might give the impression that shafts 7, 8 and 8 prime all share the same spatial plane, that is not the preferred configuration. In the preferred arrangement, a view in the direction parallel to the shafts 7, 8 and 8 prime would reveal their axes of rotation to be the vertices of an isosceles triangle, which better accommodates the use of a single associated shift drum for managing the engagement of gears to both of the clutch shafts 8 and 8 prime. Building on this triangular configuration is an offset of shaft 30 so that the axes of shafts 7, 8, 8 prime and 30 locate the four vertices of a parallelogram. The parallelogram configuration in turn allows the clutches 19 and 19 prime with the associated output gears 31 through 34 to be relocated to the lefthand side of the clutch shafts 8 and 8 prime so that a transmission configuration for vehicles with front-wheel-drive and transversely-mounted engines results. Similarly, the rotational axis of reverse idler gear 15 need not occupy the plane determined by the rotational axes of shafts 7 and 8 prime.

As already mentioned with respect to passenger car transmissions, using a torque converter in place of the fluid coupling 13 in FIG. 1 can provide needed compensation for the poor low speed torque characteristics typical of engines tuned for high specific power output. The reason a torque converter is almost ideally suited for providing such compensation is that its torque multiplication ratio is greatest under the same low crankshaft speed conditions where engine torque output is deficient. In comparison to using an extra gear ratio for providing the compensation, a torque converter thus avoids the excessive transmission output torque that can damage components or cause the drive wheels to lose traction. In this same vein, a torque converter smooths engine torque pulses at the most appropriate time—when transmission torque output is highest.

Although turbocharged Diesel truck engines do not develop high levels of specific power output, their relatively low turbocharger boost pressure at low crankshaft speed can result in clutch engagement torque ratings little more than half of the peak torque rating. Coupled with the higher manufacturing cost acceptable for truck transmissions, this disparity in torque ratings makes the use of a torque converter in place of the fluid coupling 13 in FIGS. 2 and 3 generally more desirable than in passenger car transmissions. Nevertheless, the two main reasons why using a torque converter in place of the fluid coupling 13 is more appropriate for the truck transmissions of FIGS. 2 and 3 than for the passenger car transmission of FIG. 1 have yet to be considered.

The first of these reasons concerns the fact that the transmission configurations of FIG. 2 and of FIG. 3 each employ two simple speed reduction gear sets in series for providing the greatest transmission torque multiplication ratio. Since the fluid coupling 13 contributes nothing to torque multiplication, the torque ratio is therefore limited to a value of about 10 to 1, as is the overall transmission ratio range. While such wide ratio coverage greatly exceeds the general need in passenger cars, it will often be insufficient for Diesel-powered trucks, especially when clutch engagement torque is comparatively low. Using a torque converter in place of the fluid coupling 13 will thus extend the overall torque multiplication ratio of the transmissions of FIGS. 2 and 3 to roughly 18 to 1 to thereby solve this ratio range problem which is peculiar to trucks.

The second reason why the torque converter is the hydrodynamic device of choice for trucks with turbocharged Diesel engines, while the device of choice for passenger cars is more often the fluid coupling, again relates to the wide ratio coverage commonly needed by trucks. For example, if an overall transmission torque multiplication range of 18 to 1 is achieved by combining a torque converter (in place of the coupling 13) with 9 or 10 forward speed ratios having an overall ratio range of 10 to 1, then even a high geared speed of 90 miles per hour (MPH) for the associated vehicle will not elevate the speed at which the first upshift is performed above about 9 MPH. This in turn implies that significant hydrodynamic losses will also be limited to a speed of 9 MPH because the embodiments of FIGS. 2 and 3 inherently bypass most of engine power output around the hydrodynamic device immediately upon the upshift to second gear. This low speed of 9 MPH differs markedly from the situation for current passenger cars, namely, that operation in first gear can easily exceed vehicle speeds of 30 MPH.

Now assuming an average torque converter efficiency of 70% and acceleration from rest to a vehicle speed of 35 MPH, the low limiting speed of 9 MPH for major hydrodynamic losses means that these losses will amount to less than 2% of vehicle kinetic energy at the end of the acceleration. This figure of 2% contrasts sharply with current passenger cars which typically accelerate to 35 MPH and beyond before the torque converter lockup clutch engages. If the foregoing figure of 2% is adjusted to include vehicle cruising conditions and to reflect aerodynamic and rolling resistance, then values below 1% will result.

Any need for an overall torque multiplication range in the general area of 18 to 1 supports yet another strong argument for using a torque converter in truck transmissions in general as well as in the embodiments of FIGS. 2 and 3. If a conventional 16-speed truck transmission provides an 18 to 1 ratio range with a 90 MPH geared speed, then the first four upshifts will all occur below 9 MPH, with an interval of as little as 1.06 MPH in vehicle speed separating the upshifts. By avoiding these excessive and closely spaced upshifts, a torque converter will provide much quicker initial vehicle acceleration in spite of power lost to hydrodynamic inefficiency.

Since the foregoing description of preferred embodiments has necessarily been quite specific, it has outlined only a tiny fraction of the variations which can be made in the present invention without departing from the spirit and scope of the following claims. As a way of introducing an additional example variation, it is interesting to note that the ability to perform power-on downshifts into the creeper first gear ratio of a heavy-duty truck transmission has marginal benefit because of the very low vehicle speeds at which such downshifts would be performed. This is the reason why FIG. 2 shows a transmission configuration in which the torque loading across the sprag clutch 16 is reduced in preference to having the capability of performing power-on downshifts into first gear.

In passenger cars, however, maximum engine torque is very much lower than in large Diesel-powered trucks, and first gear is used at very much higher vehicle speeds. These two factors combine to dictate relocation of the clutches 16 and 17 to the very power input side of the coupling assembly 25 in FIG. 2, with the sun gear 29 concurrently being permanently connected to the runner section of the fluid coupling 13. These changes do sacrifice torque reduction across the clutches 16 and 17 in order to extend power-off downshifting to first gear, but this tradeoff clearly becomes desirable in the case of rear-wheel-drive transmissions for use in passenger cars and light trucks. If there is no need for replacing the fluid coupling 13 in this modified configuration with a torque converter, then a further modification becomes desirable. This modification corresponds simply to using the assembly 25 from FIG. 3 in place of the assembly 25 in FIG. 2 and then adding the clutches 16 and 17 in parallel at the power input side of the assembly 25.

Two more examples of the myriad variations covered by the following claims concern the fluid coupling assembly 25 in FIG. 1. Even if the clutches 16 and 17 are deleted from the assembly 25 of FIG. 1, the inherent lockup feature as already described will still be retained. This lockup feature is applicable to and would benefit more conventional countershaft transmissions such as those exemplified by the Automatic Layshaft Transmission being developed by Ricardo-Tuck Incorporated and the automatic transmissions currently used in automotive production by Honda Motor Company.

The second variation entails using an actual lockup clutch to serve the function of the engine braking clutch 17 in FIG. 1 as well as the normal function of a lockup clutch. In particular, all of the power input gears 12 and 1 through 5 would receive engine power as transferred through a series connection of the one-way clutch and the fluid coupling or torque converter. The lockup clutch would be positioned in parallel with the series connection of the one-way clutch and the fluid coupling or torque converter, with the one-way clutch being located between the engine and the coupling or converter.

The rationale behind this last example variation of the present invention is that a lockup clutch can be disengaged during a power-on downshift to thereby utilize the fluid coupling or torque converter to cushion the ensuing engagement of the one-way clutch; the lockup clutch would be engaged immediately following automatic engagement of the one-way clutch. Positioning the one-way clutch upstream of the coupling or converter further enhances power-on downshifts by reducing the total moment of inertia accelerated by the associated engine only during power-on downshifts.

In a more broad perspective of the scope of the following claims, terms like "continuously variable transmission" are often used in patent claims without any definition beyond the established definition. That such established definitions are functional is obvious from the almost bewildering diversity of hardware that satisfies the established definition of "continuously variable transmission." This diversity of hardware includes everything from electric motor-generator sets to variable-pitch-diameter belt drives to hydrostatic and hydromechanical transmissions.

Unfortunately, no such functional definitions have been established for many of the elements in the following claims. Therefore, in accordance with the third paragraph of 35 U.S.C. §112, the following claims often make their own definitions by specifying what functions the named device or means is operative to perform. In other words, the device or means is defined by the specified functions rather than by the name given for later reference to the device or means. For instance, the "load-startup means" in the following claims is an element defined not by the words "load-startup," but by the description of function which follows this term. The words "load-startup" serve merely as a convenient label for later reference back to this element. At the same, through, the description of functions served by the load-startup means does not have clear antecedent basis in the foregoing description related to the fluid coupling 13 and its alternatives.

What is claimed is:

1. Apparatus for coupling an engine to a load through a selection of different speed ratios, the apparatus comprising:

a power input element for the apparatus, a power output element for the apparatus, load-startup means operative to initiate motion of the load by transferring power produced by the engine to the load through a first forward speed ratio, said load-startup means being capable of transferring power from the engine to accelerate the load while slippage across said load-startup means progressively decreases from 100% as the load accelerates from rest, a multi-speed gear system for making a number of different forward speed ratios available for transferring power produced by the engine from a first shaft to a second shaft, said multi-speed gear system comprising said first shaft, said second shaft and a plurality of pairs of constantly meshed gears, one gear of each of said meshed pairs of gears being continuously coupled to said first shaft and the other gear of each of said meshed pairs of gears being disengageably coupled to said second shaft, said first forward speed ratio establishing a maximum value of overall torque multiplication from said power input element to said power output element greater than each value of said overall torque multiplication ratio established by said multi-speed gear system, and transmission of power by the apparatus from the engine to the load causing said power to flow in a direction from said first shaft to said second shaft and at the same time in a direction from said power input element to said power output element.

a gearshift clutch device which (a) couples said second shaft to drive said power output element when said multi-speed gear system is transferring power produced by the engine, (b) uncouples said second shaft from said power output element to thereby allow gearshifting in said multi-speed gear system and (c) comprises a device which employs friction to accommodate at least brief partial engagement during progression from release of said gearshift clutch device to full engagement of said gearshift clutch device, and first gear means for establishing said first forward speed ratio by using said load-startup means to couple said power input element to deliver power produced by the engine to said power output element, whereby said gearshift clutch device is not required to initiate motion of the load and whereby rapid gearshifting occurs in said multi-speed gear system with concurrent rapid acceleration or deceleration of said second shaft rather than of said plurality of gear pairs.

2. The apparatus of claim 1 wherein said load-startup means delivers power produced by the engine to said first shaft and wherein said first gear means comprises a pair of constantly meshed gears, one gear of which is continuously coupled to said first shaft and the other gear of which is disengageably coupled to said second shaft.

3. The apparatus of claim 1 wherein said load-startup means comprises a hydrodynamic device which employs hydrodynamic action to transfer power produced by the engine, whereby actuation of said load-startup means to initiate motion of the load is inherently automatic.

4. The apparatus of claim 3 wherein said hydrodynamic device is a fluid coupling, whereby said hydrodynamic device is simpler and more compact than a torque converter.

5. The apparatus of claim 3 wherein (a) said first gear means comprises a pair of constantly meshed gears, one gear of which (1) rotates concentrically with but relative to said first shaft and (2) receives power transferred through said hydrodynamic device, the other gear of said first gear means being disengageably coupled to said second shaft, and (b) at lest a major portion of power produced by the engine and transferred to said first shaft inherently bypasses said hydrodynamic device, whereby upshifting from said first gear means automatically causes said major portion of power to bypass said hydrodynamic device and thereby reduce hydrodynamic losses.

6. The apparatus of claim 5 further comprising planetary gearing which has three separate power-carrying elements, a first of which is coupled to receive power from said power input element, a second of which is coupled to said load-start means and a third of which is coupled to drive said first shaft, whereby a minor portion of the power produced by the engine is transferred to said first shaft through said hydrodynamic device to thereby (a) help cushion transitions between positive and negative engine power output and (b) ensure even gear wear by indexing the angular position of said first shaft relative to that of said power input element.

7. The apparatus of claim 1 further comprising power-on downshift means operative to automatically recouple said power input element to said power output element through said multi-speed gear system to thereby terminate no-load acceleration of the engine during a sequence of events for power-on downshifting of the apparatus, whereby said power-on downshift sequence takes advantage of said rapid gearshifting in said multi-speed gear system to thereby avoid interruption in power-on operation of the engine.

8. The apparatus of claim 1 wherein each gear which is coupled to rotate with said second shaft and transfer power produced by the engine to said second shaft is disengageably coupled to said second shaft,
whereby the moment of inertia associated with said second shaft during gearchanging in said multi-speed gear system is reduced.

9. The apparatus of claim 1 further comprising a power-on downshift device which automatically recouples said power input element to said power output element through said multi-speed gear system to thereby terminate no-load acceleration of the engine during a sequence of events for power-on downshifting of the apparatus, said power-on downshift device comprising a one-way clutch which automatically engages to transfer power from the engine to the load,
whereby said power-on downshift sequence takes advantage of said rapid gearshifting in said multi-speed gear system to thereby avoid interruption in power-on operation of the engine.

10. The apparatus of claim 9 wherein said power-on downshift device automatically recouples said power input element to said first shaft to thereby terminate said no-load acceleration of the engine during said power-on downshift sequence.
whereby said power-on downshift device avoids being exposed to torque multiplication provided by said multi-speed gear system and whereby said power-on downshift sequence ensures even gear wear by periodically indexing the angular position of said first shaft relative to that of said power input element.

11. The apparatus of claim 1 further comprising (a) a second multi-speed gear system for making a number of different forward speed ratios available for transferring power produced by the engine from said first shaft to a third shaft, said second multi-speed gear system comprising said first shaft, said third shaft and a plurality of pairs of constantly meshed gears, one gear of each of said meshed pairs of gears in said second-mentioned plurality of gear pairs being continuously coupled to said first shaft and the other gear of each of said meshed pairs of gears in said second-mentioned plurality of gear pairs being disengageably coupled to said third shaft, and (b) a gearshift clutch device which couples said third shaft to drive said power output shaft when said second multi-speed gear system is transferring power produced by the engine,
whereby full powershift operation of the apparatus is achieved by using said first-mentioned and said second-mentioned gearshift clutch devices to alternate powerflow first through one and then the other of said first-mentioned and said second-mentioned multi-speed gear systems.

12. A discrete-ratio power transmission device which delivers power from an engine to a load, the transmission comprising:
a power input element for the transmission device,
a power output element for the transmission device,
a multi-speed gear system for making a number of different forward speed ratios available for transferring power produced by the engine from a first shaft to a second shaft, said multi-speed gear system comprising said first shaft, said second shaft and a plurality of pairs of constantly meshed gears, one gear of each of said meshed pairs of gears being continuously coupled to said first shaft and the other gear of each of said meshed pairs of gears being disengageably coupled to said second shaft, and transfer of power by the transmission device from the engine to the load causing said power to flow in a direction from said first shaft to said second shaft and at the same time in a direction from said power input element to said power output element,
a power-on downshift device which automatically recouples said power input element to transfer power produced by the engine to said first shaft to thereby terminate no-load acceleration of the engine during a sequence of events for power-on downshifting of the transmission device,
and a gearshift clutch device which (a) couples said second shaft to drive said power output element when said multi-speed gear system is transferring power produced by the engine, (b) uncouples said second shaft from said power output element to thereby allow gearshifting in said multi-speed gear system and (c) comprises a device which employs friction to accommodate at least brief partial engagement during progression from release of said gearshift clutch device to full engagement of said gearshift clutch device,
whereby rapid gearshifting occurs in said multi-speed gear system with concurrent rapid acceleration or deceleration of said second shaft rather than of said plurality of gear pairs and whereby said power-on downshift device (a) combines with said rapid gearshifting to make power-on downshifting practical and (b) ensures even wear of gears that are continuously coupled to said first shaft.

13. The transmission device of claim 12 wherein each gear which is coupled to rotate with said second shaft and transfer power produced by the engine to said second shaft is disengageably coupled to said second shaft by a dog clutch,
whereby the complexity of synchronizer assemblies is avoided and inertial loading of said dog clutches is reduced.

14. The transmission device of claim 12 (a) wherein said power-on downshift device comprises a one-way clutch oriented to automatically engage for transfer of power from the engine to the load and (b) further comprising (1) an auxiliary clutch device, engagement of which couples said power input element for transfer of engine braking torque to the load and (2) control means which coordinates disengagement of said auxiliary clutch device with disengagement of said gearshift clutch device during a sequence of events for power-on downshifting of the transmission device,
whereby said one-way clutch and said auxiliary clutch device complement each other.

15. The transmission device of claim 12 further comprising load-startup means which couples said power input element to transfer power to said first shaft, said load-startup means being capable of transferring power from the engine to accelerate the load while slippage across said load-startup means progressively decreases from 100%.
whereby said load-startup means reduces design requirements for said gearshift clutch device.

16. The transmission device of claim 15 wherein said load-startup means is a hydrodynamic device which employs hydrodynamic action to transfer power produced by the engine, whereby actuation of said load-startup means is inherently automatic.

17. The transmission device of claim 12 (a) further comprising a first-gear powerpath which employs a hydrodynamic device to transfer power produced by the engine from said power input element to said power output element to thereby initiate motion of the load and (b) wherein said first shaft receives power transferred from said power input element through a main powerpath which bypasses at least a majority of power produced by the engine around said hydrodynamic device, whereby said hydrodynamic device automatically initiates motion of the load, but hydrodynamic losses are at least greatly reduced when said multi-speed gear system is transferring power produced by the engine.

18. The transmission device of claim 17 wherein said main powerpath completely bypasses said hydrodynamic device, whereby hydrodynamic losses are completely avoided when said multi-speed gear system is transferring power produced by the engine.

19. The transmission device of claim 12 further comprising (a) a hydrodynamic device and associated gear system for transferring power produced by the engine from said power input element to said second shaft to thereby initiate motion of the load and (b) planetary gearing which transfers power produced by the engine from said power input element to said first shaft by combining a minor fraction of power transferred through said hydrodynamic device with a major fraction of power which bypasses said hydrodynamic device, whereby said hydrodynamic device automatically initiates motion of the load, but hydrodynamic losses are greatly reduced when said multi-speed gear system is transferring power produced by the engine, and whereby said minor fraction of power helps cushion transitions between positive and negative engine power output.

20. A discrete-ratio power transmission device which delivers power from an engine to a load, the transmission comprising:

a power input element for the transmission device, a power output element for the transmission device, a multi-speed gear system for making a number of different forward speed ratios available for transferring power produced by the engine from a first shaft to a second shaft and thereby from said power input element to said power output element, said multi-speed gear system comprising said first shaft, said second shaft and a plurality of pairs of constantly meshed gears, one gear of each of said meshed pairs of gears being continuously coupled to said first shaft and the other gear of each of said meshed pairs of gears being disengageably coupled to said second shaft, a gearshift clutch device which (a) couples said second shaft to drive said power output element when said multi-speed gear system is transferring power produced by the engine, (b) uncouples said second shaft from said power output element to thereby allow gearshifting in said multi-speed gear system and (c) comprises a device which employs friction to accommodate at least brief partial engagement during progression from release of said gearshift clutch device to full engagement of said gearshift clutch device, means operative to automatically disengage said gearshift clutch device to thereby begin a no-load acceleration of the engine utilized for power-on downshifting of the transmission device, and engine speed control means operative to automatically terminate said no-load acceleration of the engine substantially at synchronous speed of the engine, whereby rapid gearshifting occurs in said multi-speed gear system with concurrent rapid acceleration or deceleration of said second shaft rather than of said plurality of gear pairs and whereby said rapid gearshifting contributes to said power-on downshifting of the transmission device.

21. The transmission device of claim 20 wherein said engine speed control means is selected from (a) a one-way clutch oriented to automatically engage for transfer of power from the engine to the load and (b) means operative to re-engage said gearshift clutch device substantially at synchronous speed of the engine.

22. The transmission device of claim 20 wherein said engine speed control means comprises a one-way clutch which automatically recouples said power input element to said first shaft to thereby terminate said no-load acceleration of the engine, whereby said one-way clutch avoids being exposed to torque multiplication provided by said multi-speed gear system and whereby said power-on downshifting of the transmission device ensures even wear of gears that are continuously coupled to said first shaft.

23. The transmission device of claim 20 (a) further comprising a first-gear powerpath which employs a hydrodynamic device to transfer power produced by the engine from said power input element to said power output element to thereby initiate motion of the load and (b) wherein said first shaft receives power transferred from said power input element through a main powerpath which bypasses at least a majority of power produced by the engine around said hydrodynamic device, whereby said hydrodynamic device automatically initiates motion of the load, but hydrodynamic losses are at least greatly reduced when said multi-speed gear system is transferring power produced by the engine.

24. The transmission device of claim 23 wherein said engine speed control means comprises a one-way clutch which automatically recouples said power input element to said first shaft to thereby terminate said no-load acceleration of the engine, whereby said one-way clutch ensures even wear of gears that are continuously coupled to said first shaft.

25. The transmission device of claim 20 further comprising (a) a second multi-speed gear system for making a number of different forward speed ratios available for transferring power produced by the engine from said first shaft to a third shaft, said second multi-speed gear system comprising said first shaft, said third shaft and a plurality of constantly meshed pairs of gears, one gear of each of said meshed pairs of gears in said second-mentioned plurality of gear pairs being continuously coupled to said first shaft and the other gear of each of said meshed pairs of gears in said second-mentioned plurality of gear pairs being disengageably coupled to said third shaft, and (b) a gearshift clutch device which couples said third shaft to drive said power output element when said second-mentioned multi-speed gear system is transferring power produced by the engine, said engine speed control means being operative to automatically engage said second-mentioned gearshift clutch device to thereby terminate said no-load acceleration of the engine, whereby full powershift operation of the transmission device is achieved by using said first-mentioned and said second-mentioned gearshift clutch devices to alternate powerflow first through one and then the other of said first-mentioned and said second-mentioned multi-speed gear systems.

26. The transmission device of claim 25 wherein each one of least two gears continuously coupled to said first shaft (a) constantly meshes with one gear disengageably coupled to said second shaft and (b) constantly meshes with another gear which is disengageably coupled to said third shaft, whereby two different transmission gear ratios are available using each of said at least two gears, thereby making the transmission device simpler and more compact.

27. Apparatus for coupling an engine to a load through a selection of different speed ratios, the apparatus comprising:

a multi-speed gear system for making a number of different forward speed ratios available for transferring power produced by the engine from a first shaft to a second shaft, said multi-speed gear system comprising said first shaft, said second shaft and a plurality of pairs of gears each pair of which transfers power produced by the engine from said first shaft to said second shaft through an individually disengageable coupling, and a load-startup device selected from fluid couplings and torque converters and coupled to transfer substantially all power produced by the engine to a first-.speed power input gear which rotates concentrically with said first shaft but at a speed relative to said first shaft when power produced by the engine is being transferred through said first-speed power input gear, said first-speed power input gear being in meshing engagement with a first-speed power output gear disengageably coupled to said second shaft, and said first shaft being coupled to receive at least a majority of power being produced by the engine through a main powerpath which bypasses said load-startup device, whereby hydrodynamic losses associated with said load-startup device inherently are at least greatly reduced when said multi-speed gear system is transferring power from the engine to the load.

28. The apparatus of claim 27 further comprising planetary gearing which transfers power produced by the engine to said first shaft by combining a minor fraction of said power transferred through said load-startup device with a major fraction of said power which bypasses said load-startup device, whereby said minor fraction of power helps cushion delivery of power to the load through said multi-speed gear system.

29. The apparatus of claim 27 wherein said main powerpath completely bypasses said load-startup device, whereby hydrodynamic losses are completely avoided when said multi-speed gear system is transferring power from the engine to the load.

30. Apparatus for extending power-on downshifting capability to a non-powershift transmission apparatus which delivers power from a power output shaft of an engine to a load and which comprises a multi-speed gear system and a friction clutch device in power-transmitting series connection with the multi-speed gear system, the friction clutch device being briefly disengaged to allow gearshifting in the multi-speed gear system and the power-on downshift apparatus comprising:

an overrunning clutch which automatically couples the engine output shaft to deliver power to the non-powershift transmission apparatus when the engine output shaft turns in its forward direction of rotation, said overrunning clutch also having an unlocked mode which automatically allows the non-powershift transmission apparatus to overspeed the engine output shaft in said forward direction of rotation, engine braking means, engagement of which prevents said overrunning clutch from operating in said unlocked mode to thereby allow the engine to brake the load through the non-powershift transmission apparatus, and control means which coordinates disengagement of said engine braking means with disengagement of the friction clutch device during a sequence of events for power-on downshifting, whereby said overrunning clutch automatically terminates no-load acceleration of the engine output shaft during said sequence of events, thereby making power-on downshifting feasible.

* * * * *